United States Patent [19]

Schweiso

[11] 4,409,844
[45] Oct. 18, 1983

[54] FLOW RATE MEASURING DEVICE

[76] Inventor: Robert J. Schweiso, 1028 Edmonds Ct., Sunnyvale, Calif. 94087

[21] Appl. No.: 295,102

[22] Filed: Aug. 21, 1981

[51] Int. Cl.³ ........................... G01F 1/00; G01F 9/00
[52] U.S. Cl. ...................................... 73/861; 73/427; 73/168
[58] Field of Search .................... 73/3, 171, 223, 219, 73/427, 428, 861, 863.52, 168, 119 A; 128/771

[56] References Cited

U.S. PATENT DOCUMENTS

| 824,532 | 6/1906 | Dunn | 73/427 X |
| 1,765,668 | 6/1930 | Hartzell | 73/428 X |
| 2,062,173 | 11/1936 | Haskins | 73/168 |
| 2,165,705 | 7/1939 | Houser | 73/215 |
| 2,281,512 | 4/1942 | Reed | 73/215 |
| 3,001,397 | 9/1961 | Leonard | 73/861 |
| 3,831,446 | 8/1974 | Dye | 73/861 |
| 3,922,913 | 12/1975 | Scott | 73/219 X |
| 4,085,616 | 4/1978 | Patel et al. | 73/428 X |

Primary Examiner—Charles A. Ruehl

[57] ABSTRACT

A flow rate measuring device for use with liquids or appropriate dry materials, comprising a receptacle calibrated to indicate flow rate (e.g. gallons per minute) rather than static volume, and where a specific sampling period (e.g. 5 seconds) is also specified and which establishes the ratio between the collected volume and the flow rate (e.g. 1/12th) thereby enabling a person to obtain a direct reading of the flow rate from a particular source simply by capturing that flow during the specified sampling period and then noting the level of collected material relative to the calibrations. This invention also provides for the inclusion of additional data such as the average costs related to each flow rate and the potential savings at a lower flow rate. For further convenience, the device of this invention may be manufactured from a flexible plastic material that could be folded flat, thus enabling it to be enclosed in a conventional envelope as for mailing.

9 Claims, 3 Drawing Figures

FLOW RATE MEASURING DEVICE

FIELD OF THE INVENTION

This invention relates to a means for measuring the flow rates of liquids and also certain dry materials.

DISCUSSION OF PRIOR ART

Most of the equipment designed to measure liquid flow rates, such as rotameters and other mechanically driven devices, is relatively expensive and usually requires a moderate degree of technical knowledge in order to be used effectively. Thus, the average person has had no way to conveniently measure the water flow rates of faucets or showers within his home.

This is unfortunate because if people were able to measure such flows for themselves, they might realize just how much water they were using and how much they could save through the use of restrictor attachments. This information would not only encourage the conservation of water, but it would also lead to significant reductions in the energy required to heat that water.

Aside from using direct reading flowmeters, the most elemental way to determine a rate of flow is to capture all the liquid which has passed from a particular outlet over a specific period of time, determine the volume of that liquid and then compute as necessary to obtain a figure that could be expressed in conventional terms such as gallons or liters per minute (GPM or LPM). Unless a person has a calibrated container that indicates volume, this would be a very cumbersome and usually inaccurate procedure. Furthermore, even with such a container, a person would still have to multiply the noted volume by the appropriate time ratio in order to determine the amount that would flow in one minute. Because of these impediments, very few people really know how much water and energy they are currently using. Nor do they realize how much they could save simply by using restrictors. For example, a typical faucet or shower will frequently pass as much as 6 GPM (approximately 22 LPM) whereas with restrictors, the flow could be reduced to as little as 2 GPM (approximately 8 LPM).

It should not be assumed, however, that such dramatic reductions in flow would necessarily detract from the quality of a shower. On the contrary, several very effective low flow shower heads have been disclosed in such patents as U.S. Pat. Nos. 3,831,860 of Gullaksen and 4,190,207 of Fienhold and Cammack. These heads are specifically designed with their own internal restrictors, and include many other features which assure excellent performance even at the lower flow rates.

Returning again to the subject of flow measurement, it should be noted that a similar problem arises when dealing with certain dry materials such as powders or granular products. Although the flow rates of these commodities might be stated in different terms relating to the cubic volume or weight of material passed per unit of time, the problem remains essentially the same. Furthermore, the equipment required to measure these flows is relatively expensive and at least moderately complex to use.

OBJECTS OF THE INVENTION

It is therefore the general object of this invention to provide a family of simple, inexpensive devices which, when suitably calibrated, will make possible the direct reading of flow rates of liquids or dry materials with reasonable and repeatable accuracy.

A more specific object of the invention is to provide a simple flow measuring device that can be used in homes, hotels, motels, hospitals, nursing homes, dormitories and other such institutions to determine the flow rates of water emanating from faucets and shower heads.

A further object of this invention is to provide a flow metering device that can be collapsed, folded flat and sent through the mail in a standard size envelope; perhaps enclosed with a utility statement.

Yet another objective of this invention is to provide a flow measuring device which also gives direct readings with regard to the cost of water and energy at each indicated flow rate and that can also show the savings which could be achieved through the use of restrictors.

A particular advantage of the proposed invention over the prior art is that it would be extremely inexpensive and very simple to use. It would therefore be ideally suited to a variety of other applications in addition to those related to the conservation of water and energy.

DESCRIPTION OF THE DRAWINGS

The above objects, features and advantages of the present invention will become more apparent from the detailed description of the invention and the accompanying drawings in which.

DESCRIPTION OF THE PREFERRED EMBODIMENTS

Figure 1:
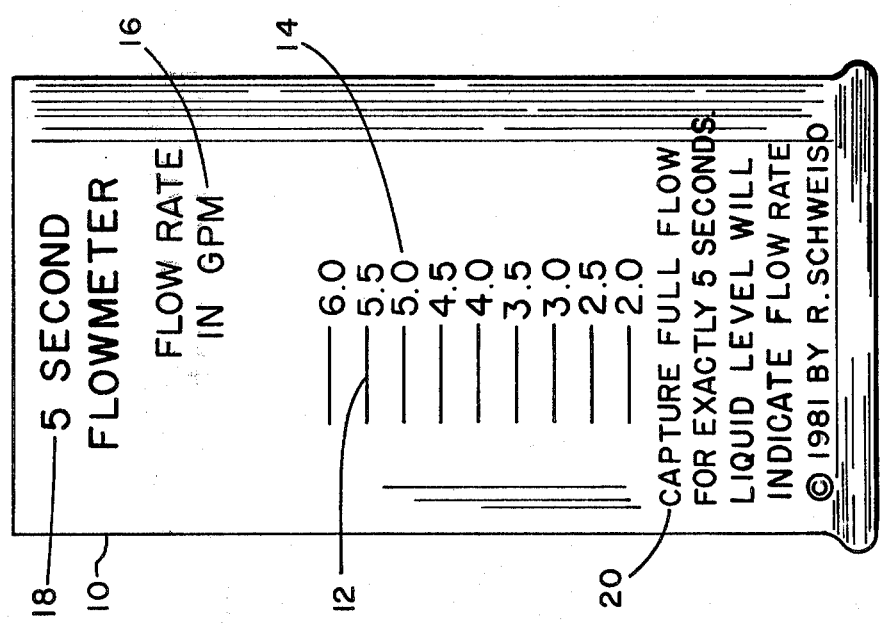
FIG. 1 shows a side elevation of one embodiment of my flow measuring device which, although it has the appearance of a conventional beaker or cylinder, is unique for the reasons described herein.

Referring to the drawings, FIG. 1 shows a conventional appearing beaker 10 with graduated markings 12 arranged in a vertical column. Parallel to this is a column of numbers 14, each of which relates to its adjacent marking. Contrary to expectation, however, these graduations do not reflect volume, but rather, are expressions of flow rate in gallons per minute (GPM), as clearly indicated by the column heading 16.

The position of each mark and the value of its adjacent number is determined by the volume of flowing liquid that would be captured in the beaker over a particular period of time, hereinafter referred to as the sampling period. In most cases, the duration of this period would be considerably less than one minute. With regard to FIG. 1, the sampling period is 5 seconds, as prominently indicated at 18 and as also specified in the abbreviated instructions 20. Additional graduations for different sampling periods could be provided at other positions around the circumference, with the understanding that each such column of graduations would bear a clear indication of the appropriate sampling period. Beaker 10 is shown in cylindrical form and without handle or pour spout, but only for the purpose of clarity. It should be understood, therefore, that all these features could be provided in a variety of ways to suit particular applications.

It is important to note that although the beaker of FIG. 1 looks like a conventional measuring device, its function and mode of usage are entirely unique. A specific point of difference is that the graduations described above are not indicators of contained volume. In this respect there is a point of similarity to U.S. Pat. No. 3,530,722 of Miller, in which his indicia reflect measures that are different from the actual contained volume.

In the broader sense, however, my invention is distinctly different from Miller's device and also from other related patents such as U.S. Pat. Nos. 150,113 of Vom Hofe and 3,924,472 of Harris. This is because all of them provide only for the measure of a static volume. Although they all serve a very important purpose, none of them can be used conveniently to measure flow; nor were they intended to do so. By the same token, the flow measuring device of this invention is not intended to measure static volumes, although calibrated graduations for that purpose could be added if desired.

As previously indicated, the position of each graduation is related to the flow rate and sampling period. This relationship may be expressed as a proportion wherein the ratio between the actual volume ($V_a$) at each graduation, and the related flow rate volume ($V_{fr}$) is the same as the ratio between the sampling period ($T_s$) and the time period expressed in the flow rate ($T_{fr}$), which is usually one minute (60 seconds). Therefore:

$V_a/V_{fr} = (T_s/T_{fr})$ and thus, if $T_s = 5$ seconds,
$(V_a/V_{fr}) = (5/60) = (1/12)$ A further understanding of these relationships may be assisted by the following parallel analysis. Since a U.S. gallon contains 128 fluid ounces (oz), a flow rate of 6 1 GPM may be restated as 728 oz per minute or 12.8 oz per second. During a 5 second sampling period, that flow would produce a volume of 64 oz. For the purpose of calibration, it is this volume that would determine the position of the 6.0 GPM graduation on the beaker. Similarly, the 2.0 GPM graduation would be positioned at a volume of 21.3 oz, and each intervening graduation would occur at 5.3 oz increments. It should be understood, however, that none of the actual volume figures referred to above would appear on the beaker, but rather, only the graduated flow rates and sampling period would be shown. Conventional volume graduations could be provided, of course, but would not be required as a part of this invention.

Figure 2:
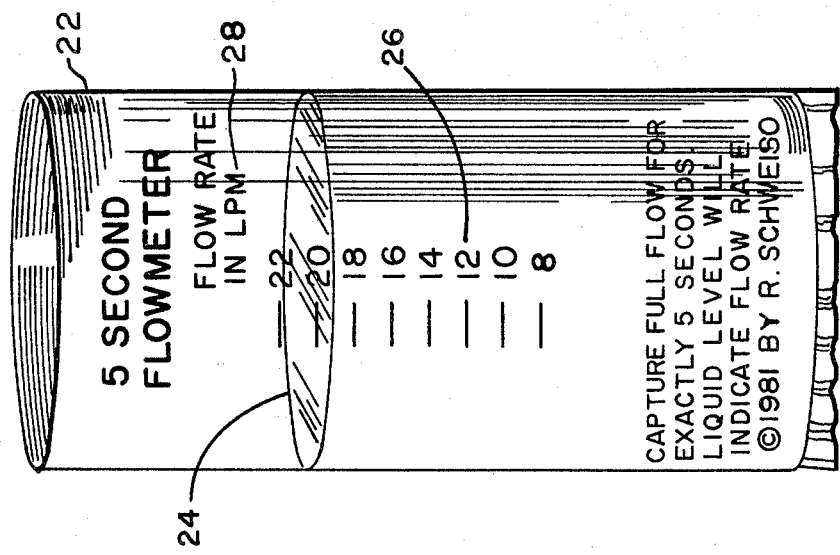
FIG. 2 is a perspective view of another embodiment of the invention in the form of a semi-transparent plastic bag that is partially filled with a liquid.

A second embodiment of the invention is shown in FIG. 2, where the container 22 is a plastic bag which is shown partially filled with a liquid 24. In this embodiment, the graduations 26 are in terms of liters per minute (LPM) as indicated by the column heading 28, but the sampling period remains at 5 seconds. Although bag 22 could be manufactured from material as thin as 0.0015 inch, it would be more practical and leak resistant to use stock with a thickness of 0.002 to 0.004 inch. Consistent with the previously described reasoning, the container of FIG. 2 would have its 8 LPM graduation positioned at a volume of 666.7 cubic centimeters (cc), approximately 22.5 oz. The position of the 22 LPM graduation would be at 1.83 liters (62 oz) and intervening graduations would occur at 166.7 cc (5.64 oz) increments.

Figure 3:
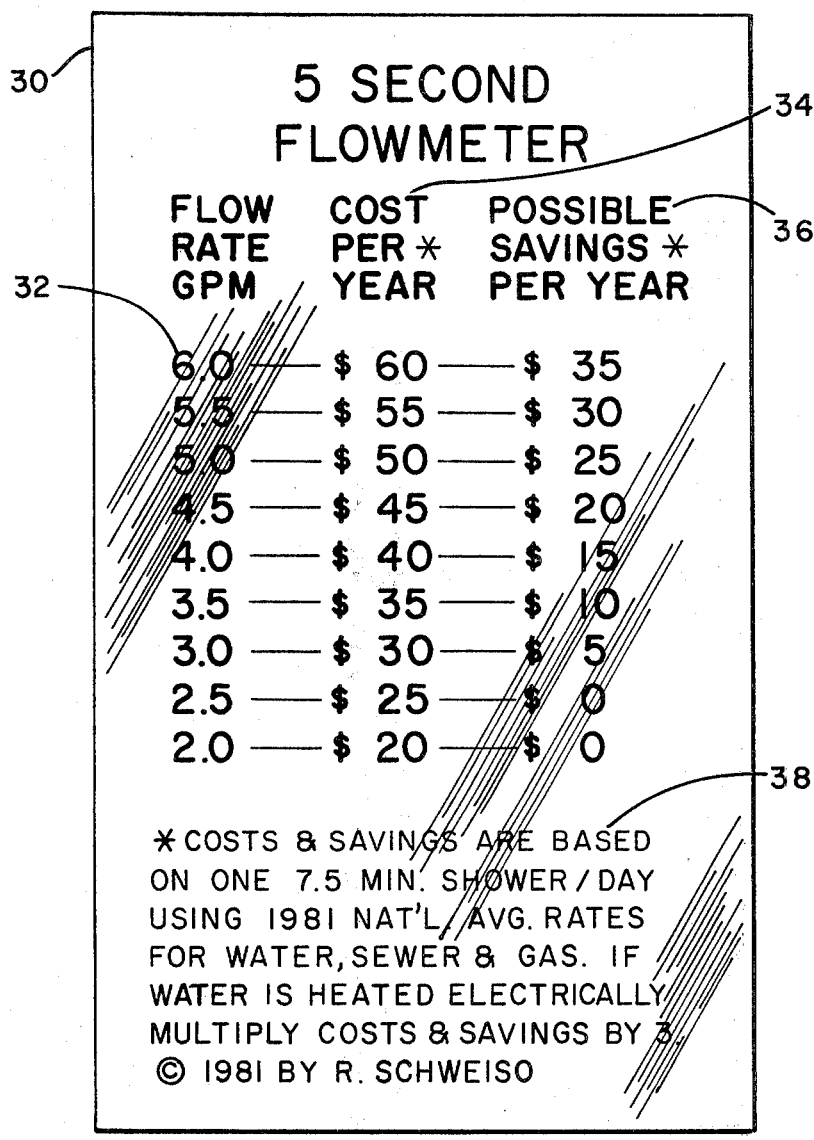
FIG. 3 shows a front elevation of a bag similar to the one shown in FIG. 2, but which displays additional information.

FIG. 3 shows a similar plastic bag 30 in its unfilled, flat condition. Here the graduations 32 again reflect GPM for a 5 second sampling period. In addition, there are also figures reflecting the average annual cost of water and energy 34 for each flow rate and the amount which could be saved 36 through the use of restrictor devices. Abbreviated supporting data is shown at 38. As with FIGS. 1 and 2, only one face of this bag is shown, and it should therefore be understood that other information or graduations for different sampling periods could be displayed on the opposing surface.

To use the direct reading flow measuring devices of this invention, a person would simply follow the provided instructions, holding the container under the flowing outlet (e.g. faucet or shower) for the prescribed sampling period. He would then remove it and observe the level of the contained media (e.g. water). That level, and its relationship to the graduations would provide a direct indication of the flow rate. If the person were using the embodiment shown in FIG. 3, he would also receive a direct indication of the average annual cost of showers at each flow rate and what the potential savings might be if a restrictor were used.

Essentially similar procedures would be followed in the development and use of this flow measuring device for applications involving dry materials. The only exception might be that the graduations could be in terms of cubic measure or weight of material that would flow over a particular period of time, again usually one minute. As with liquid media, the position of each graduation would be determined by the volume of material which would be collected in the container during the specified sampling period, at each particular flow rate.

For example, consider a device of this invention intended to measure the flow rate of dry material in the range of 1 to 5 cubic feet per minute (CFM) with a specified sampling period of 10 seconds. Since one cubic foot is the equivalent of 1728 cubic inches, a flow of 1 CFM for the 10 second period would produce a volume of $1728 \times 10/60$, which equals 288 cubic inches. It is this volume that would determine the position of the first (1 CFM) graduation, with the final (5 CFM) mark being set at a volume of 1440 cubic inches. As previously mentioned, none of these volumes would appear on the container. Instead, only the sampling period, flow rate graduations and other related information would be shown.

Although the flow measuring device of this invention would not be practical for evaluating extremely high or low flow rates, it is ideally suited to the indicated range, plus or minus approximately 60 percent. Beyond these limits, however, either the sample period would become too short to be accurately judged, or the container would become too large for convenient handling.

While the subject invention has been described in terms of a few preferred embodiments, it is contemplated that persons reading those descriptions and studying the drawings will realize various alterations, permutations and modifications thereof. It is therefore intended that the following appended claims should be interpreted as including all such variations as fall within the true spirit and scope of the present invention.

What I claim is:

1. A flow rate measuring device comprising: a non-through-flowing receptacle for collecting samples of a flowing media; graduations on said receptacle expressing the volume of flow per basic time period; and a legend, also on said receptacle, specifying a sample collection period that is different from the expressed basic time period; wherein the actual volume at each graduation is different from the expressed volume by the ratio between the sample collection period and the basic time period.

2. A flow rate measuring device as described in claim 1, wherein said receptacle is in the form of a bag constructed of flexible plastic material, thin enough to be collapsed and folded flat.

3. A flow rate measuring device comprising: a non-through-flowing receptacle for collecting samples of a flowing media; graduations on said receptacle calibrated in terms of flow rate; and a legend, also on said receptacle, specifying the duration of time during which said samples would be collected; wherein said graduations include numbers relating to the cost of said media at each flow rate and the potential savings at a lower flow rate.

4. A flow rate measuring device comprising: a non-through-flowing receptacle for collecting samples of a flowing media; graduations displayed thereon indicating flow rates expressed as the volume of media that would flow during a basic unit of time; and a legend displayed on said receptacle specifying a period of time, different from said basic unit, during which said samples would be collected, wherein the ratio between the two time periods is defined as the sample period divided by the basic unit of time; and where each graduation is positioned to be coincident with the level surface of a volume of the contained media which is equal to the volume expressed in that graduation, multiplied by the aforementioned time ratio.

5. A flow rate measuring device as described in claim 4, wherein said receptacle is in the form of a bag constructed of flexible plastic material, thin enough to be collapsed and folded flat.

6. A flow rate measuring device as described in claim 4, wherein said graduations further indicate average annual costs related to each flow rate, and also the potential savings at a lower flow rate.

7. A flow rate measuring device comprising: a non-through-flowing receptacle for collecting samples of flowing water; graduations displayed thereon indicating flow rates in gallons per minute; and also a legend specifying a sampling period of 5 seconds; wherein the ratio between the sampling period and the period of time given in the flow rate expression is 5/60; and where each graduation is positioned to be coincident with the surface of a volume of water, within the receptacle, that is equal to the expressed flow rate volume multiplied by the time ratio, 5/60.

8. A flow rate measuring device as described in claim 7, wherein said receptacle is in the form of a bag constructed of flexible plastic material, thin enough to be collapsed and folded flat.

9. A flow rate measuring device as described in claim 7, wherein said graduations also include numbers reflecting the annual cost of water and energy at each flow rate, and the amounts that could be saved by restricting the emission to a lower flow rate.

* * * * *